United States Patent [19]
Christian

[11] Patent Number: 5,895,910
[45] Date of Patent: Apr. 20, 1999

[54] ELECTRO-OPTIC APPARATUS FOR IMAGING OBJECTS

[75] Inventor: Donald J. Christian, Fremont, Calif.

[73] Assignee: FMC Corporation, Chicago, Ill.

[21] Appl. No.: 08/630,651

[22] Filed: Apr. 11, 1996

[51] Int. Cl.[6] .................................................. H01J 40/14
[52] U.S. Cl. ............................. 250/208.2; 250/214 R
[58] Field of Search .......................... 250/208.1, 208.2, 250/223 R, 223 B, 222.1, 226, 214 R, 214 B, 214 C, 559.07, 559.05, 559.08, 559.46

[56] References Cited

U.S. PATENT DOCUMENTS

| | | | |
|---|---|---|---|
| 4,893,346 | 1/1990 | Bishop | 382/8 |
| 5,180,122 | 1/1993 | Christian et al. | 244/134 F |
| 5,250,801 | 10/1993 | Grozinger er al. | 250/223 B |
| 5,296,702 | 3/1994 | Beck et al. | 250/226 |
| 5,314,071 | 5/1994 | Christian et al. | 209/4 |
| 5,491,333 | 2/1996 | Skell et al. | 250/223 B |
| 5,585,626 | 12/1996 | Beck et al. | 250/222.1 |

Primary Examiner—David C. Nelms
Assistant Examiner—John R. Lee
Attorney, Agent, or Firm—Speckman Pauley Petersen & Fejer

[57] ABSTRACT

The invention provides an imaging system for the detection and sorting of objects in a work space. The invention uses a modulated electromagnetic signal and then filters each received signal. The received modulated signals by an array of photosites are used to create an image of an object.

14 Claims, 3 Drawing Sheets

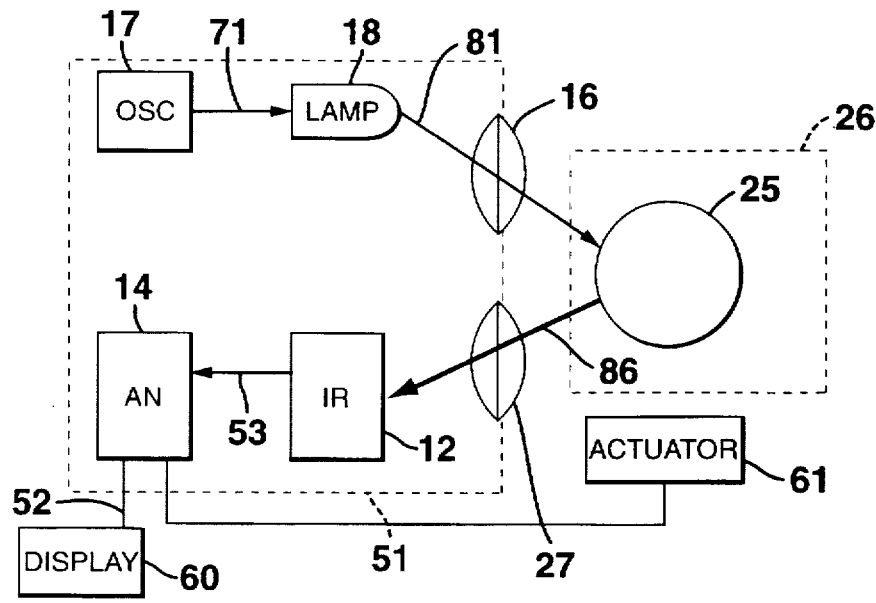
FIG_1
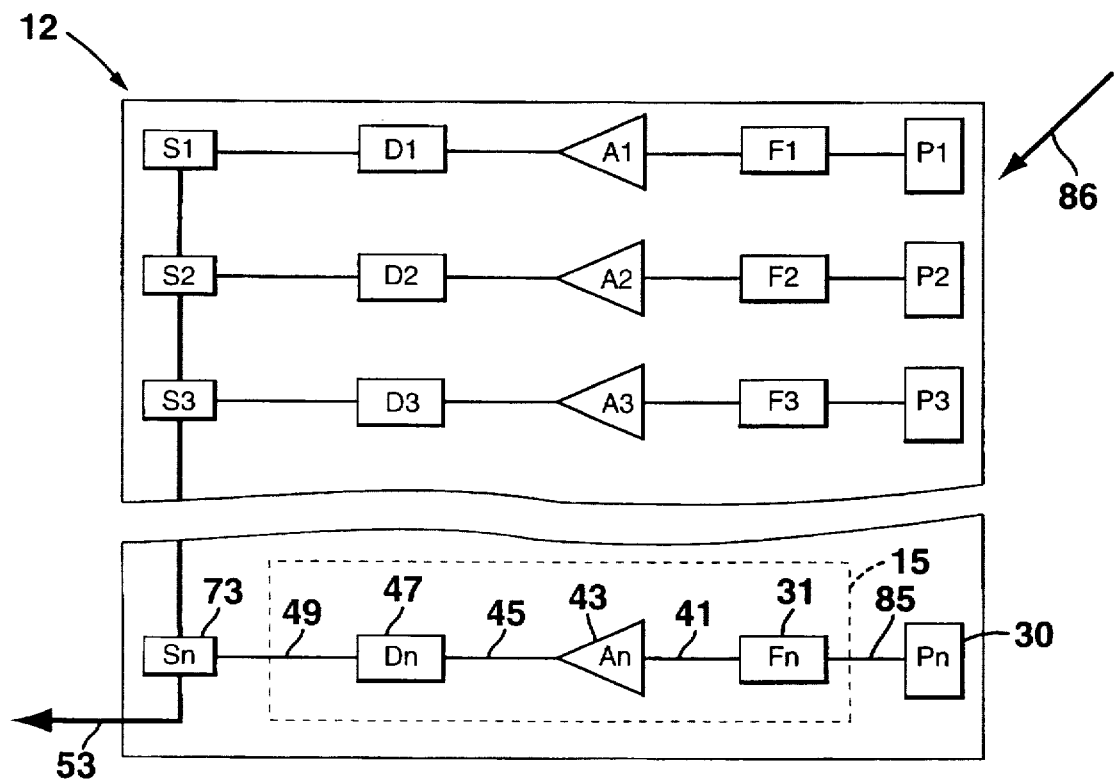
FIG_2

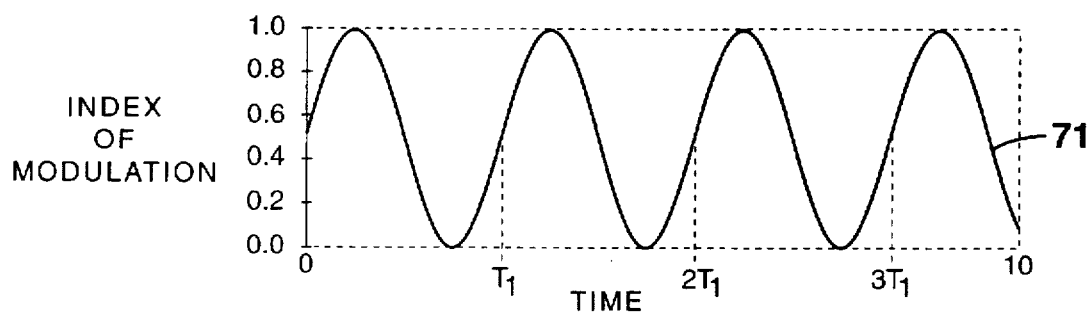
FIG_3
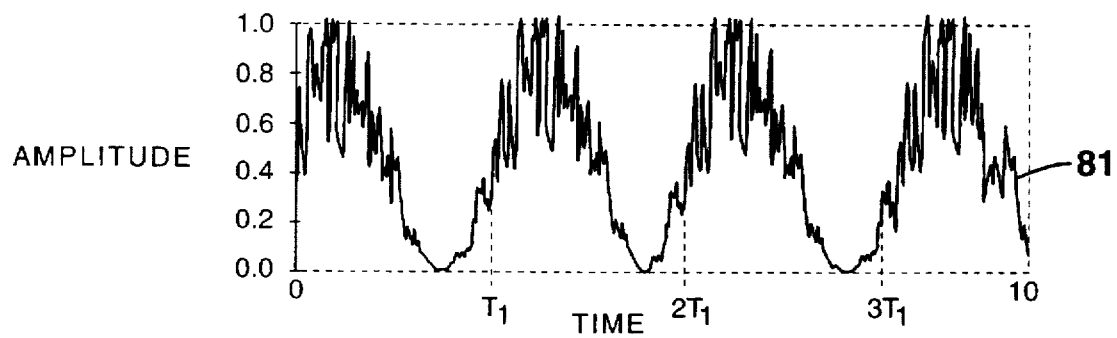
FIG_4
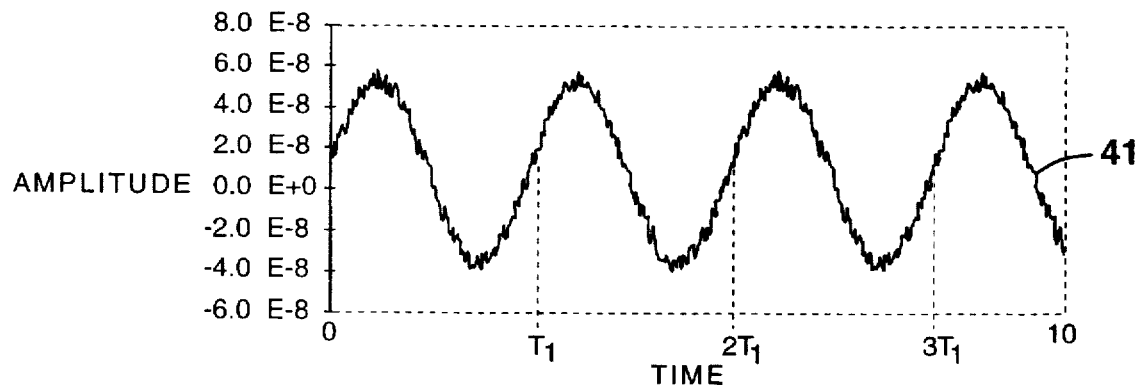
FIG_5
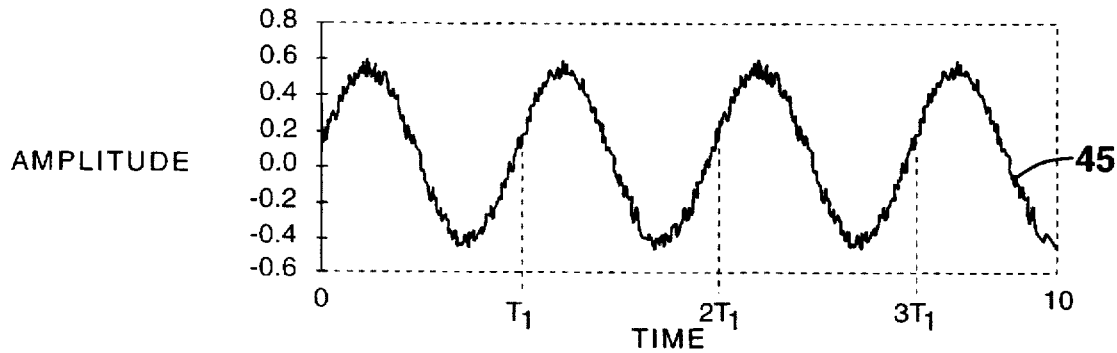
FIG_6

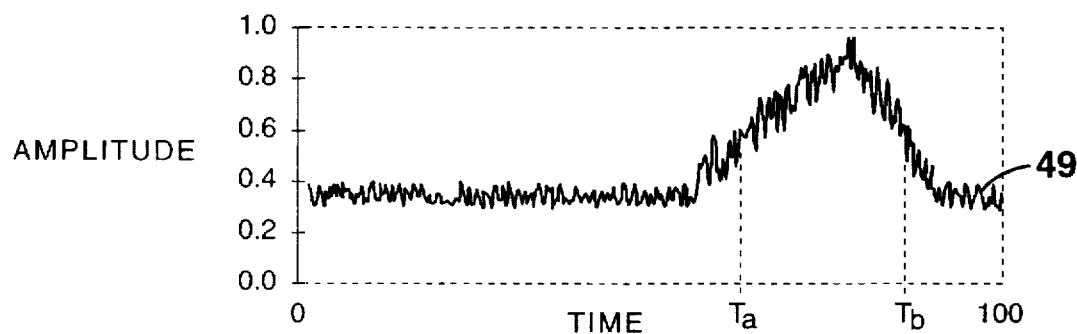
FIG_7
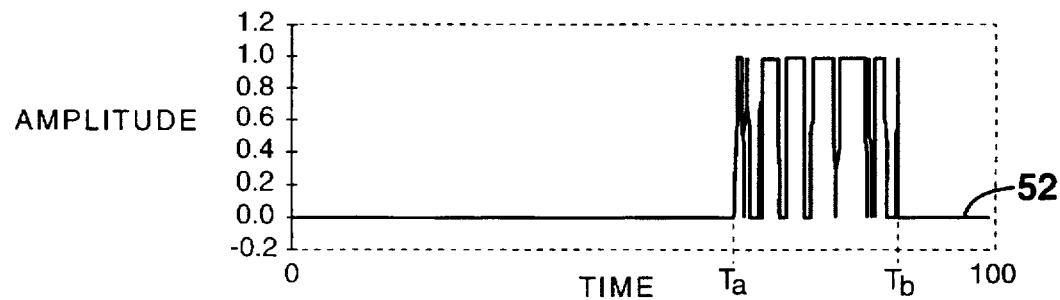
FIG_8
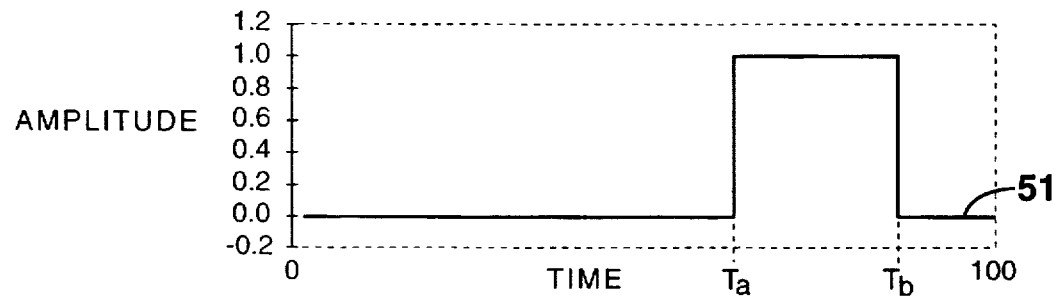
FIG_9
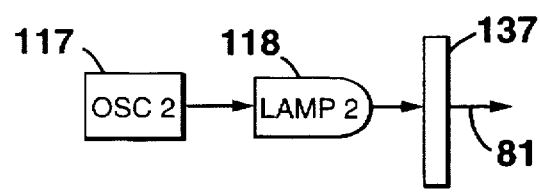
FIG_10

ELECTRO-OPTIC APPARATUS FOR IMAGING OBJECTS

BACKGROUND OF THE INVENTION

Optical imagers that are used for sortation and inspection illuminate the objects to be inspected (work pieces) with one or more emitters or radiant energy sources. The work pieces reflect or transmit the light to one or more receivers, which detect the combined results of the reflected and transformed emissions. From the received signal, certain features are imaged and based on the image, a decision is made for each and every work piece about how it should be processed or sorted. The image is displayed on a visible monitor and the decisions are communicated to an actuator for realization. For example, in bulk material benefication, high grade work pieces are optically sensed and sorted out from those of lower grade. The information gathered by the sensor is typically used as a control input for an industrial process.

The descriptive features extracted from the work pieces are selected according to the nature of the work pieces, the differences between work pieces and non-work pieces, and the needs of the process. For example, when inspecting metal parts for the presence of contaminative rust, the sorter optics are set to be sensitive to the characteristic spectral signature of hematite. For sorting glass cutlet during recycling, visible color is the discriminatory feature and the optics are tuned to the visible spectrum. Optical tuning is well known and is commonly done through a judicious selection of emitters, optical filters, and receivers. A popular light source is the light emitting diode (LED), because of its stable and relatively narrow spectrum and its capacity for modulation.

In the prior art, there are physical and technological limitations that limit capacity for adaptation and usefulness. Emitters are available with only a limited number of spectral configurations, and their spectrum often does not adequately meet the requirements of the application. Also, the temporal response of many emitters is sluggish, restricting systems to continuous or unacceptably slow operation. For example, no technology exists for arbitrarily modulating an ultraviolet light source. Receiver insensitivity is also a common problem, especially in noisy environments and when high speed operation is required. Another limitation of the prior art is that the high level of radiated light creates problematical side effects in the operating environment. For example, photosensitive work pieces such as predeveloped photographic film and electronic photo-etched boards are permanently damaged when struck by light. The high levels of emitted radiation also require high operating currents to be supplied, reducing the life of the emitters and limiting portability.

SUMMARY OF THE INVENTION

It is an object of the invention to provide an improved imaging device for use in automatic applications such as sorting.

The invention provides a light source which may emit in the visible, ultraviolet, or infrared spectra. The invention provides an improved rejection ratio for background light versus ambient noise. It also provides improved sensitivity, and therefore a longer standoff between camera, illuminator, and work piece. It provides a preferential sensitivity to its internal light sources, while at the same time rejecting light from all other sources. The invention further provides an imaging system to provide an image of an object to be detected.

BRIEF DESCRIPTION OF THE DRAWINGS

FIG. 1 is a schematic illustration of an inventive detector.

FIG. 2 illustrates integrated receiver used in the embodiment illustrated in FIG. 1.

FIG. 3 is an illustration of the time-varying signal generated by an oscillator illustrated in FIG. 1.

FIG. 4 is an illustration of the modulated signal generated by an emitter illustrated in FIG. 1.

FIG. 5 is an illustration of a signal generated by a filter illustrated in FIG. 2.

FIG. 6 is an illustration of a signal generated by an amplifier illustrated in FIG. 2.

FIG. 7 is an illustration of a signal generated by a demodulator illustrated in FIG. 2.

FIG. 8 is an illustration of a display signal generated by an analysis circuit illustrated in FIG. 1.

FIG. 9 is an illustration of an actuation signal generated by an analysis circuit illustrated in FIG. 1.

FIG. 10 is an illustration of another embodiment of an emitter which may be used in the embodiment illustrated in FIG. 1.

DETAILED DESCRIPTION OF THE PREFERRED EMBODIMENT

An oscillator 17, in FIG. 1, is electrically connected to an emitter 18, which transmits electromagnetic energy with a spectrum centered at an wavelength $\lambda_1$. The oscillator 17 is tuned to generate a time-varying signal 71 at frequency $f_1$ and a period $T_1$. Signal 71 is used to modulate the output of the emitter 18, producing a modulated beam 81.

The emitter 18 is a light emitting diode (LED), such as the model TOX 9005 made by Texas Optoelectronics, Inc. of Garland, Tex. In an alternative embodiment the emitter 18 is a fluorescent lamp such as model F20T12/BLB made by General Electric of Schenectady, N.Y. Other acceptable emissive sources with various spectral characteristics that may be substituted for the emitter 18 are manufactured by Texas Instruments, Sharp, Opto Diode, Honeywell, Motorola, Siemens, and Hiyoshi Electric.

A first lens 16 is placed adjacent to the emitter 18. The emitter 18 is positioned so that the modulated beam 81 passes through the first lens 16 into a work space 26, where a work piece 25 is staged in preparation for analysis. Transport of the work piece 25 into the work space 26 may be done with a material handling system such as a high-speed conveyor.

A second lens 27 is placed adjacent to the work space 26. The modulated beam 81 focused by the first lens 16 into the work space 26, is reflected, transmitted, or otherwise transformed by work piece 25, and is focused by the second lens 27 onto an integrated receiver 12 as received light 86. The second lens 27 creates an inverted image of the work piece 25 in image space and the integrated receiver 12 is placed at so that the resulting image is focused on its surface.

The integrated receiver 12 is electrically connected to an analysis circuit 14, which is electrically connected to a display 60 and an actuator 61. The analysis circuit 14 is a digital signal processor such as model TMS32010 manufactured by Texas Instruments, Dallas Tex.

In operation, the oscillator 17 generates a modulating signal 71. The modulating signal 71 is illustrated by the periodic wave shown in FIG. 3, plotting the index of modulation against time. This modulating signal 71 is sent to the emitter 18 causing the emitter 18 to emit an electromagnetic modulated signal 81 of wavelength $\lambda_1$ with a modulating intensity at a frequency $f_1$, driven by the modulating signal 71, as illustrated in FIG. 4 plotting amplitude against time. The electromagnetic modulated signal 81 passes through or across work piece 25 and a fractional portion eventually reaches the receiver 12 as part of a received light 86.

The modulated signal 81 is additionally modulated and convolved according to the instantaneous physical characteristics and situation of work piece 25. Also, some ambient electromagnetic noise is unavoidably introduced into received signal 85. Noise emanates from various natural and artificial electromagnetic sources including but not limited to electrical equipment, the actuator 61, sunlight, electrostatic discharges, and artificial illumination.

The integrated receiver 12 contains electronic circuitry to spatially quantize the image formed by the received light 86. The received light 86 (comprising signal 81 plus noise, modulated by the work piece 25) is demodulated to form a multiplex electrical signal 53. The achromatic image data is superimposed on the multiplex signal 53, which is forwarded on to the analysis circuit 14. The integrated receiver 12 is describe in more detail below.

FIG. 2 is a detailed view of the integrated receiver 12. Light is focused by the receiving lens 27 on to a photosensitive surface of the integrated receiver 12. An array (a plurality) of N photosensitive photosites $P_1, P_2, \ldots P_n$ are individually activated by the received light 86, causing a set of electronic signals 85 to be transduced, in analogous correspondence with the impinging light 86. N cascades are attached to the photosites, with each cascade electrically connected to a photosite and with the Nth cascade 15 electrically connected to the Nth photosite $P_n$ 30. Each cascade comprises a filter, an amplifier, and a demodulator, with the Nth cascade 15 comprising a filter 31, an amplifier 43, and a demodulator 47. N samplers, which are sample-and-hold devices, are attached to the cascades, with each sampler electrically connected to a cascade and with the Nth sampler 73 electrically connected the Nth cascade 15.

Input for the integrated receiver 12 arrives as broad-band modulated and unmodulated light 86. For purposes of illustration, the signal flow will be traced along channel N. The signal flow on all channels is identical to the signal flow along channel N. Integrated receiver 12 is fabricated as a single monolithic semiconductor device using conventional photolithgraphic techniques. The light 86 arriving at photosite $P_n$ 30 is transduced into an electrical signal 85 and is simultaneously and identically fed as input to a filter $F_n$ 31. The filter 31 is a bandpass filter tuned to frequency $f_1$. A signal of the frequency $f_1$ is isolated by the filter 31, which blocks all signals except those at the frequency $f_1$. The filter 31 outputs a filtered signal 41, which is amplified by the amplifier 43, producing an amplified signal 45. FIG. 5 illustrates the filtered signal 41, plotting amplitude against time. FIG. 6 illustrates the amplified signal 45, plotting amplitude against time. The amplified signal 45 is demodulated by the demodulator 47, generating a demodulator output 49 which is passed along to the Nth sampler 73. FIG. 7 illustrates the demodulator output 49 plotting amplitude against time. The Nth sampler 73 measures the voltage level of the demodulator signal 49, which is output from the demodulator 47. This voltage is retained as a charge in memory and dumped onto an output bus as a bus signal 53 at predetermined time intervals. Each of the plurality of samplers is sequentially triggered to generate an output at an appropriate moment within the clocking cycle, and the cycle is repeated. In this manner, the bus signal 53 is time-multiplexed to contain the data from each signal processing chain. In the preferred embodiment, this cycle is set to repeat at rate of 60 Hertz for a receiver array of 1024 channels, but may be adjusted as necessary. It is also possible to generate a television signal that is compatible with the RS-170 or NTSC standard for viewing and processing as a conventional video image. In the other cascades, the bandpass filters $F_1, F_2, F_3 \ldots$ are identical to $F_n$, also being tuned to pass signals of the frequency $f1$. In addition, in this embodiment, all of the amplifiers $A_1, A_2, A_3, \ldots A_n$ are identical. Also all of the demodulators $D_1, D_2, D_3, \ldots D_n$ are identical. Similarly, the samplers $S_1, S_2, S_3, \ldots S_n$ are also identical.

The analysis circuit 14 periodically samples and measures the voltages of the samplers $S_1, S_2, 2S_3, \ldots S_n$ and performs an analysis. FIG. 8 illustrates the display signal 52 sent from the analyzer 14 to the display 60, plotting amplitude versus time and corresponding to the demodulator signal 49 illustrated in FIG. 7. FIG. 9 illustrates the actuation signal 51 sent from the analyzer 14 to the actuator 61, plotting amplitude versus time and corresponding to the output signal illustrated in FIG. 7. In the preferred embodiment each measurement can be treated as an n-dimensional vector and classified using pattern recognition, neural networking, or stochastic analysis. These techniques are well known in current literature. The analysis circuit outputs a display signal 52 and an actuation signal 51 indicating whether or not the viewed work piece meets the pre-selected criteria. In FIG. 7, the high rise in amplitude between times $T_a$ and $T_b$ indicates the characteristic being measured on the work piece 25, such as mold with the tomato being the work piece 25. The detection of this characteristic, such as mold, and analysis by the analysis circuit 14 causes a rise in amplitude of the display signal 52 and actuation signal 51 between times $T_a$ and $T_b$ or at a set time delay after those times.

An array consisting of an array of sampler voltages is displayed on an optional electronic monitor 60 for viewing by an operator. The monitor 60 is a video monitor such as model SS-19H sold by Toshiba Video of Buffalo Grove, Ill. The monitor 60 is set to enhance the pre-selected features so that the operator can easily view their pattern.

Based on the detection of purely desirable characteristics within specimen work piece 25, the actuator 61 processes the work piece 25 normally. In the case 10 where undesirable physical characteristics are detected, the actuator 61 processes the work piece 25 exceptionally. For example, acceptable fruit is harvested normally and moldy or otherwise unacceptable fruit is returned to the field where it can complete decomposition naturally. The actuator 61 is an electromagnetic actuation device such as the model TOM-3 paddle sold by FMC of Madera, Calif.

It is not necessary that the receiver 12 be spectrally sensitive to the modulated signal 81 from the emitter 18. It is only necessary that some of the modulated energy be detectable at the time it reaches the receiver 12. For example, the receiver 12 can be blind to wavelengths less than 550 NM but the emitter 18 can still emit light at 366 NM. The optical signals that are generated by the emitters 18 are individually marked or tagged by the modulation frequency $f_1$ of the oscillators 17. Even when the wavelength radiated by the emitters 18 is changed through some nonlinear physical phenomenon such as fluorescence, each individual signal is still uniquely identified, filtered, and analyzed by this receiver arrangement. This arrangement thereby relaxes the spectral performance requirements for both the emitters and the receiver and permits the use of inexpensive semiconductor devices.

This can be very useful in measuring the work pieces 25 that may have a natural fluorescence such as the mold found naturally on fruits and vegetables. In the case of tomatoes attacked by field mold, a modulated ultraviolet signal is absorbed at one wavelength (such as 366 NM) and modulation frequency (such as 50 K Hz) is reradiated at a different wavelength (such as 450 NM) but at the same modulation frequency (50 K Hz). The details of the physical phenomenon may vary with the particular species and variety of mold.

It is not necessary that the wavelength shift function be understood or even 35 consistent, as long as the re-radiated signal is within the wide spectrum of the receiver 12. For example, different species of mold reradiate at different wavelengths. It is not necessary to tune the apparatus for each mold variety. The readjustment is automatic as long as the reradiation is within the wide band of receiver sensitivity. New and unknown mold varieties in other parts of the world are likely to meet this broad and loose requirement.

Since the filter 31 removes all signals that are not modulated at frequency $f_1$, the apparatus removes background noise effectively. This allows the detection of extremely faint signals through high amplification of the filtered signal 41. Because the filter 31 is precisely matched to the frequency $f_1$ generated by the correspondent oscillator 17, all noise output by the receiver 12 is rejected. This includes light that has only a DC (constant) component, making the apparatus highly immune to interference from natural sources such as sunlight, moonlight, and starlight. The receiver 12 thereby picks up vanishingly faint electromagnetic signals that may for example have passed through a nearly opaque work pieces 25. This capability to "see through" nearly opaque objects is useful for sorting food articles such as bottled baby food for contamination by stones or by particles of metal.

The ability to detect faint optical signals also allows the emitter 18 to be operated at a substantially reduced output level. This provides benefits of longer emitter life, reduced operating current and correspondingly lower energy consumption that supports portable and battery powered operation.

A problem with prior art is that the high level of radiated light creates problematical side effects in the operating environment. For example, photosensitive work pieces such as predeveloped photographic film and electronic photo-etched boards are permanently damaged when struck by light. The drastically reduced light level emitted by the current invention permits its use with work pieces that contain such photosensitive materials. The level of emitted light is so low that in normal operation it can not be detected by the human eye—ambient light swamps the emitters completely. This makes the device usable in applications that require stealth such as night vision and security monitoring and imaging.

In another embodiment of the invention, the oscillator 17 and the emitter 18 in the embodiment illustrated in FIG. 1 are replaced with an oscillator 117, a lamp 118, and a filter 137 as illustrated in FIG. 10. These components are placed in the embodiment illustrated in FIG. 1. The emitter 118 may be a discharge lamp, such as a fluorescent bulb and is arranged to radiate through an optical filter 137. The optical filter 137 is an interference filter such as the model 06-3531 manufactured by Spindler and Hoyer, 459 Fortune Blvd., Milford, Mass. and passes only a specific narrow spectrum. The optical filter 137 removes all unwanted electromagnetic signals at certain wavelengths, while passing electromagnetic signals whose wavelength is within the target band through and onto work piece 25, thus allowing the use of an emitter which provides a broad spectrum.

The invention is achromatic in that it does not depend on a specific wavelengths of light, but may use emitters at a single wavelength or a plurality of wavelengths. This allows the use of an emitter with a broader spectrum as shown in the preferred embodiment. Preferably the electromagnetic radiation has an optical wavelength $\lambda_1$, which in the specification and claims means infrared, visible, and ultraviolet. The invention may also be applied to electromagnetic radiation outside of this spectrum.

While the preferred embodiment of the present invention has been shown and described herein, it will be appreciated that various changes and modifications may be made therein without departing from the spirit of the invention as defined by the scope of the appended claims.

What is claimed is:

1. An apparatus for imaging objects, comprising:
    means for generating an electromagnetic signal;
    means for modulating the intensity of the electromagnetic signal, so that the intensity of the electromagnetic signal varies at a first frequency;
    an array of photosites placed to receive radiation from the electromagnetic signal;
    means for focusing the electromagnetic signal onto the array of photosites;
    a plurality of signal processing cascades tuned to the first frequency, wherein each signal processing cascade of the plurality of signal processing cascades is electrically connected to a different photosite of the array of photosites; and
    an analysis circuit electrically connected each signal processing cascade of the plurality of signal processing cascades.

2. The apparatus, as recited in claim 1, further comprising a plurality of samplers, wherein each sampler of the plurality of samplers is electrically connected between the analysis circuit and a signal processing cascade of the plurality of signal processing cascades.

3. The apparatus, as recited in claim 2, wherein the each signal processing cascade of the plurality of signal processing cascades, comprises:
    a bandpass filter tuned to the first frequency, electrically connected to the receiver;
    an amplifier, electrically connected to the bandpass filter; and
    a demodulator electrically connected between a sampler of the plurality of samplers and the amplifier.

4. The apparatus, as recited in claim 3, further comprising, a means for displaying output from the analysis circuit.

5. The apparatus, as recited in claim 4, further comprising a mechanical actuator, which is actuated by the analysis circuit.

6. The apparatus, as recited in claim 3, further comprising a mechanical actuator, which is actuated by the analysis circuit.

7. The apparatus, as recited in claim 1, wherein the means for generating the electromagnetic signal, comprises a discharge lamp.

8. The apparatus, as recited in claim 7, wherein the means for generating the electromagnetic signal, further comprises a wavelength filter which passes electromagnetic radiation centered around a first wavelength.

9. The apparatus, as recited in claim 7, wherein the electromagnetic signal is of a wavelength that cannot be detected by the array of photosites.

10. The apparatus, as recited in claim 1, wherein the means for focusing the electromagnetic signal, comprises a lens adjacent to the array of photosites.

11. The apparatus, as recited in claim 1, wherein the means for generating an electromagnetic signal, generates an electromagnetic signal centered around a first wavelength which is within an optical spectrum.

12. A method for detecting objects, comprising the steps of:

generating a electromagnetic signal;

modulating the electromagnetic signal intensity at a first frequency;

transmitting the modulated electromagnetic signal through a work space;

focusing the modulated electromagnetic signal which passes through the work space onto an array of photosites;

generating a response signal from electromagnetic radiation which impinges on each photosite of the array of photosites;

passing a response signal from each photosite of the array of photosites through a different signal processing cascade of a plurality of signal processing cascades tuned to the first frequency; and analyzing the characteristics of the response signals from each photosite of the array of photosites, which passes through a signal processing cascade of the plurality of cascades.

13. The method, as recited in claim 11, wherein the step of passing a response signal through a signal processing cascade, comprising the steps of:

passing the response signal through a band pass filter tuned to the first frequency;

amplifying the part of the response signal which passes through the band pass filter; and demodulating the amplified part of the response signal which passes through the band pass filter.

14. The method, as recited in claim 12, wherein the electromagnetic signal has a wavelength centered around a first wavelength that is undetectable by the array of photosites, and further comprising the step of fluorescing mold with the modulated electromagnetic signal, so that the mold generates a modulated electromagnetic signal of a wavelength centered around a second wavelength that is detectable by the array of photosites.

\* \* \* \* \*